United States Patent
Crossman

[19]
[11] Patent Number: 5,842,662
[45] Date of Patent: Dec. 1, 1998

[54] TENSION DEVICE AND STORAGE RACK FOR FISHING LINE SPOOLS

[76] Inventor: Larry G. Crossman, 1184 SW. 23rd Ave., Boynton Beach, Fla. 33426

[21] Appl. No.: 933,676

[22] Filed: Sep. 19, 1997

Related U.S. Application Data

[60] Provisional application No. 60/026,575 Sep. 23, 1996.
[51] Int. Cl.[6] .......................... B65H 49/14; B65H 59/04
[52] U.S. Cl. .................................. 242/422.4; 242/594.3; 242/902
[58] Field of Search .............................. 242/422.4, 422.5, 242/422.6, 422.8, 594.3, 594.4, 129.6, 129.62, 902, 156, 156.1, 156.2

[56] References Cited

U.S. PATENT DOCUMENTS

| | | | |
|---|---|---|---|
| 2,767,931 | 10/1956 | Woods et al. | 242/422.5 |
| 3,011,735 | 12/1961 | Lachat | 242/902 |
| 3,026,059 | 3/1962 | Dennler | 242/902 |
| 4,548,368 | 10/1985 | Tomlinson | 242/156 |
| 4,669,686 | 6/1987 | Huber et al. | 242/422.4 |
| 5,322,236 | 6/1994 | Smith | 242/156 |
| 5,544,839 | 8/1996 | Burch | 242/902 |
| 5,634,610 | 6/1997 | Walsh | 242/422.4 |
| 5,709,350 | 1/1998 | Davis et al. | 242/902 |

FOREIGN PATENT DOCUMENTS

| | | | |
|---|---|---|---|
| 2421128 | 10/1979 | France | 242/594.3 |

Primary Examiner—John M. Jillions

[57] ABSTRACT

An apparatus comprising a rack like structure for holding fishing line spools for storage and an attached tension device for applying tension to the line spools for fishing reel loading applications; the line spools being held on the structure by a removable rod being inserted through the spools' center holes, the rod then being housed horizontally on the structure, by each end being placed into a groove contained on each of the structure's upright bases respectively. The tension device, comprising a stationary arm and a pivoting arm, these being connected by a compression spring, is mounted on the structure's horizontal support members through bushings, and in such a way as to allow the tension device to traverse the entire length of the structure's horizontal axis, back and forth, and parallel to the rod containing the line spools, whereby allowing access to apply tension to any individual line spool. A grooved wheel, attached to the pivoting arm's uppermost end, when depressed against a line spool's rim, creates tension on the spool, and thus on the line contained there-on, so the line can be reeled tightly onto a fishing reel so as to avoid a backlashing effect.

4 Claims, 4 Drawing Sheets

TENSION DEVICE AND STORAGE RACK FOR FISHING LINE SPOOLS

This application claims benefit of USC Provisional Application No. 60/026,575 filed Sep. 23, 1996.

BACKGROUND—FIELD OF INVENTION

This invention relates to fishing line spools, specifically to an apparatus for storing such spools and applying tension to such spools for reel loading applications.

BACKGROUND—DESCRIPTION OF PRIOR ART

Fishing line is purchased on spools, which in turn have to be loaded onto fishing reels. Since most fishermen use line, often several types and tests of line, to accommodate several rods and reels, they face the task of loading the line from the spools onto the reels. Most of these fishermen have devised a method to accomplish this, the most common being placing the spool on a stick or pencil, having a pal hold it, and reeling it onto the reel while squeezing the line between two fingers to apply tension so it is wound tightly onto the reel. This is often awkward and uncomfortable.

There is an assortment of gadgets on the market that attempt to remedy this. Most are plastic and hold a single spool of line which has to be removed and replaced each time a different spool of line is desired, usually by additional removal of hardware as well. Some of these devices apply tension to the line, some do not. Some contact the line, some bounce all over the place during use while some can be held stationary with the aid of suction cups or a foot. Some clamp onto expensive fishing rods, some are quite flimsy and some require removal of the rod from the reel. None seem to accomplish their intended purpose without some disadvantage.

The LINEWINDER, featured in BASS PRO SHOPS 1997 MASTER CATALOG, and the ADD-A LINE™, manufactured by AMERICAN KNOWHOW of Santa Clorida, Calif., are plastic and are intended to be clamped onto the fishing rod during the loading process. The LINEMINDER®, by CUBA SPECIALTY, New York, also clamps onto the rod. Each of these devices hold one spool of line at a time with some sort of tension being applied, one method using pressure on the line itself, which is abrasive to the line. The LINE BOX, manufactured under the REMINGTON ARMS Trademark, is a tackle box style holding several spools of line, with the line exiting the box they are contained in through grommet lined holes, the idea being the friction between the grommet and the line creating tension on the line. Finger pressure is necessary as well. The LINE IN REELER, also featured in BASS PRO SHOPS 1997 MASTER CATALOG, is a floor (or flat surface) model line winder, that holds one spool of line and uses line contact to create tension on the line. The latest device, the PORTABLE SPOOLING STATION, manufactured by BERKLEY® OUTDOOR TECHNOLOGIES GROUP, Spirit Lake, Iowa, is designed to sit on a flat surface also, and holds one spool of line while applying tension to the line at the spool's hub. It's advertisement pictures the reel removed from the rod during the loading process.

All of these devices address the reel loading issue, but only partially, and some with some significant disadvantages. Only one addresses multiple spools of line. There is also a large, motorized line winder offered to line retailers by their line suppliers to load customers' reels at retail sites, usually for a nominal fee. The reel is disengaged from the rod and mounted onto this device for filling. This particular device is not available to the public or to the average fisherman. There is room for improvement over these methods for reel loading and storage of line, particularly since this is a task every fisherman must perform, with the exception of cane polers and hand liners.

OBJECTS AND ADVANTAGES

Accordingly, several objects and advantages of my tension device and storage rack for fishing line spools become apparent:

(a) to provide a sturdy facility to hold and store multiple spools of fishing line simultaneously, since more than one type of line is usually desired;

(b) to provide a means for applying tension to the line on the same facility;

(c) to provide such tension with a device designed to access any of the multiple spools contained on the facility without removal or repositioning of the spools;

(d) to provide tension on the line in such a way as to avoid line abrasion or line contact, and also eliminating the need to apply any finger pressure to the line during reel filling;

(e) to provide a method for filling reels that avoids clamping any object onto the fishing rod, or having to remove the reel from the rod during reel filling.

Further objects and advantages are to provide convenience by having the means to apply tension to the spools for reel loading on the same facility as is used to store the spools. Furthermore, to provide a device that is easy to use and of a simple design, but which is of a sturdy construction to afford it a long life.

DRAWING FIGURES

Figure 3A:
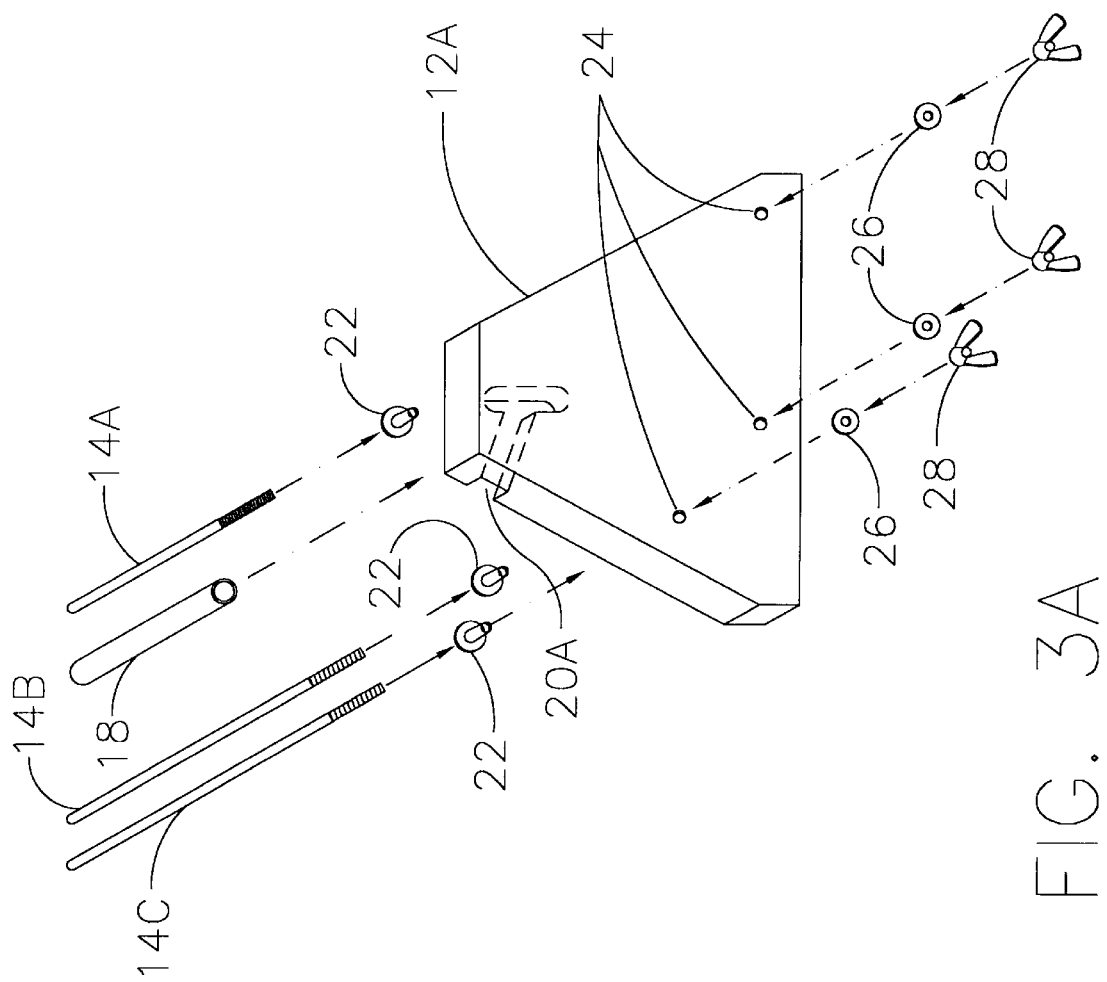
Figure 3B:
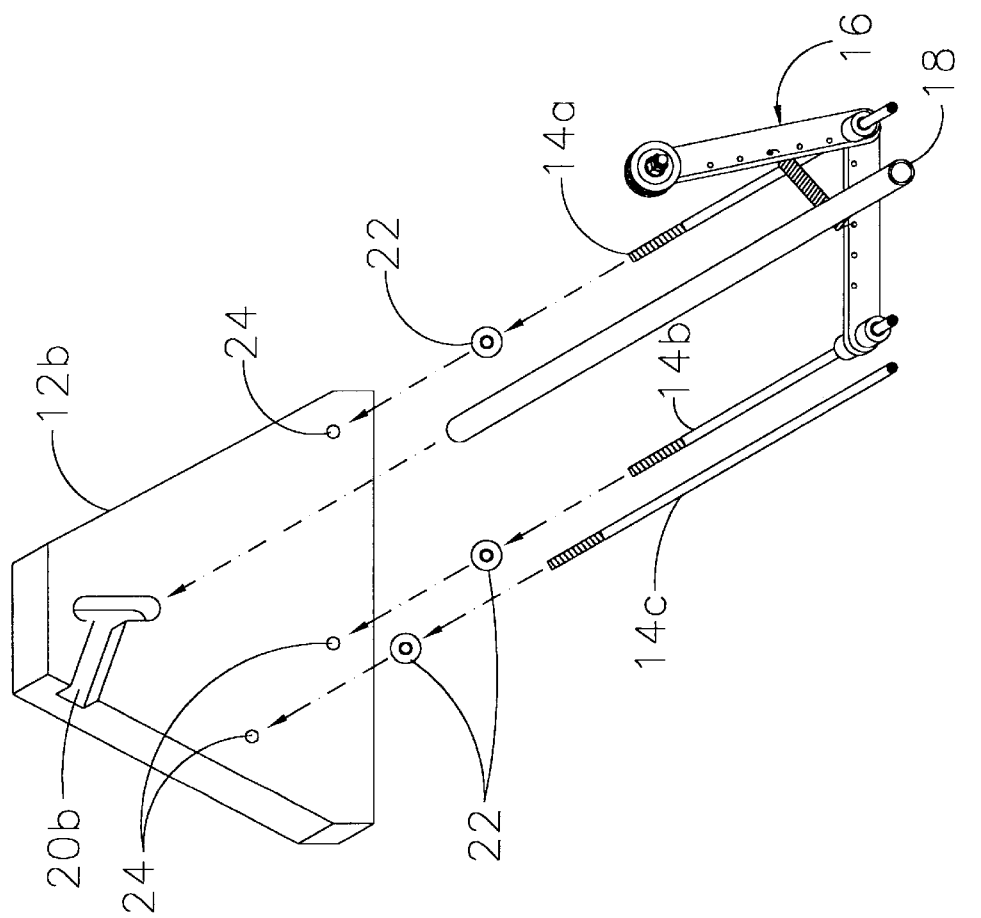

FIGS. 3A and 3B together show an exploded isometric view of the entire invention.

Figure 4:
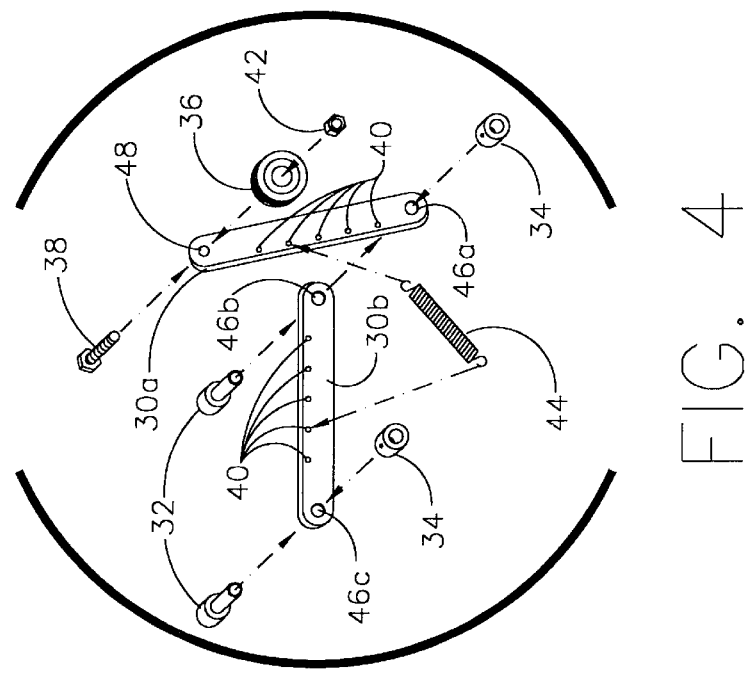

FIG. 4 is an exploded view detailing an assembly shown in FIG. 3B

| Reference Numerals In Drawings | |
|---|---|
| 12a | left base |
| 12b | right base |
| 14a | front rod (strut) |
| 14b | center rod (strut) |
| 14c | rear rod (strut) |
| 16 | tension arm assembly |
| 18 | supply rod |
| 20a | left groove |
| 20b | right groove |
| 22 | T-nuts (6) |
| 24 | holes in bases (6) |
| 26 | flat washers (6) |
| 28 | wingnuts (6) |
| 30a | upper arm (tension arm assembly) |
| 30b | lower arm (tension arm assembly) |
| 32 | step bushing |
| 34 | set collars (2) |
| 36 | plastic wheel |
| 38 | bolt |
| 40 | adjustment holes - tension arms |
| 42 | nut |
| 44 | tension spring |

-continued

Reference Numerals In Drawings

| | |
|---|---|
| 46a | hole - lower (arm 30a) |
| 46b | hole - front (arm 30b) |
| 46c | hole - rear (arm 30b) |
| 48 | hole - upper (arm 30a) |

SUMMARY

The above entitled invention is an apparatus comprising a storage rack for spools of fishing line and an attached, sliding tension device for applying tension to the line spools to facilitate filling fishing reels with line.

DESCRIPTION—FIGS. 1 to 4

Figure 1:
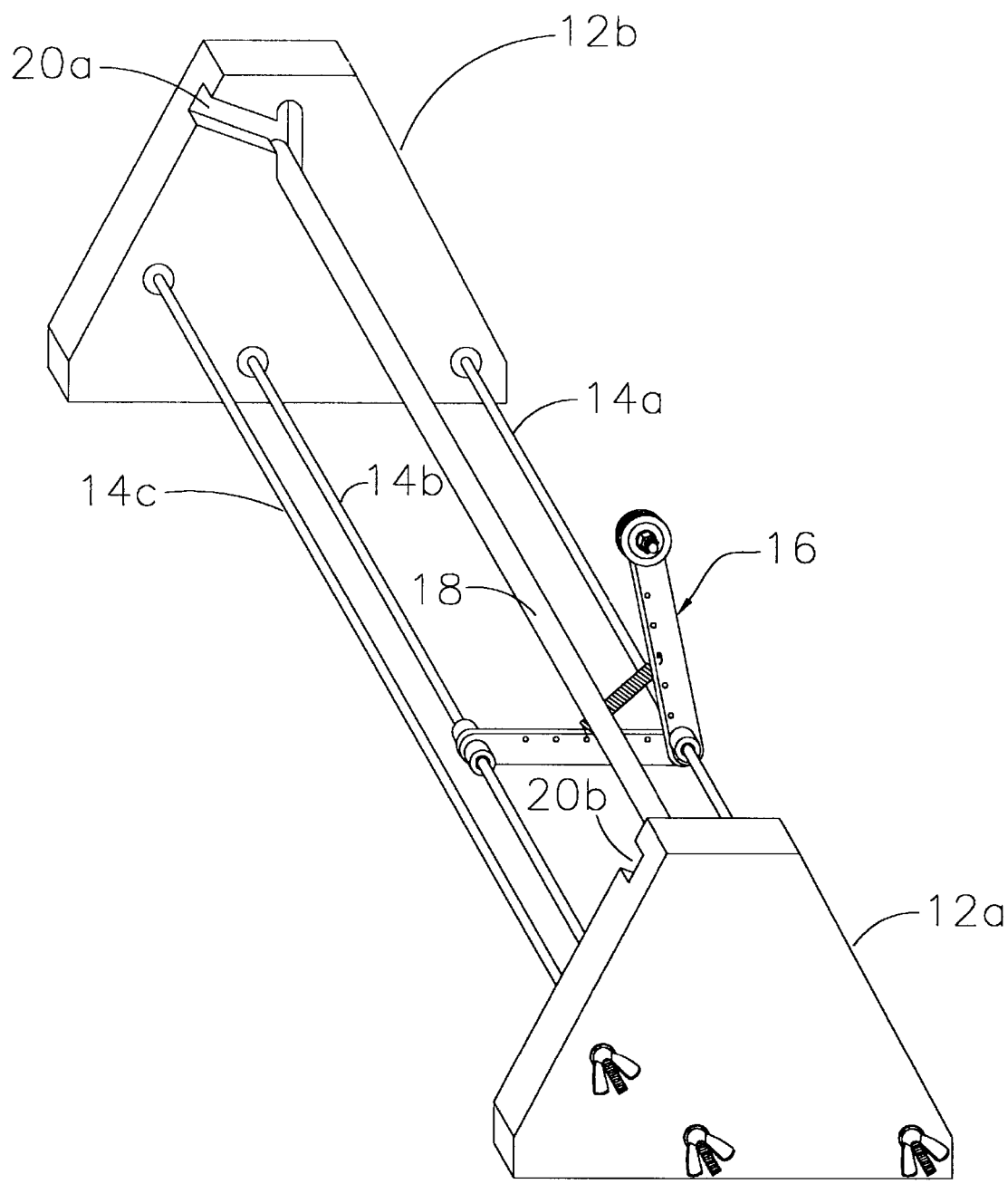
FIG. 1 is an isometric view of my invention.

A typical embodiment of the above entitled invention is shown in an isometric view in FIG. 1. The overall dimensions of this embodiment are roughly 24" L×8" H×10 ¾" W. The dimensions are based with some consideration of the sizes of available manufactured fishing line spools that the invention will accommodate. The overall dimensions, particularly the length, can be enlarged or diminished accordingly to accommodate more or fewer line spools.

This embodiment of the invention has two bases 12a,12b which form the upright supports (FIG. 1). The bases 12a,12b are connected forming a rack-like structure by securing three parallel rods 14a, 14b, 14c which act as spreader bars or struts (FIG. 1) to the bases 12a,12b. Two of these rods 14a,14b also provide the mounting base and guide for the tension arm assembly 16 (FIG. 3B). A larger diameter rod 18 is mounted horizontally on the device or invention, with each of its ends supported by a groove 20a,20b featured on each base 12a,12b respectively (FIG. 1).

Figure 2A:
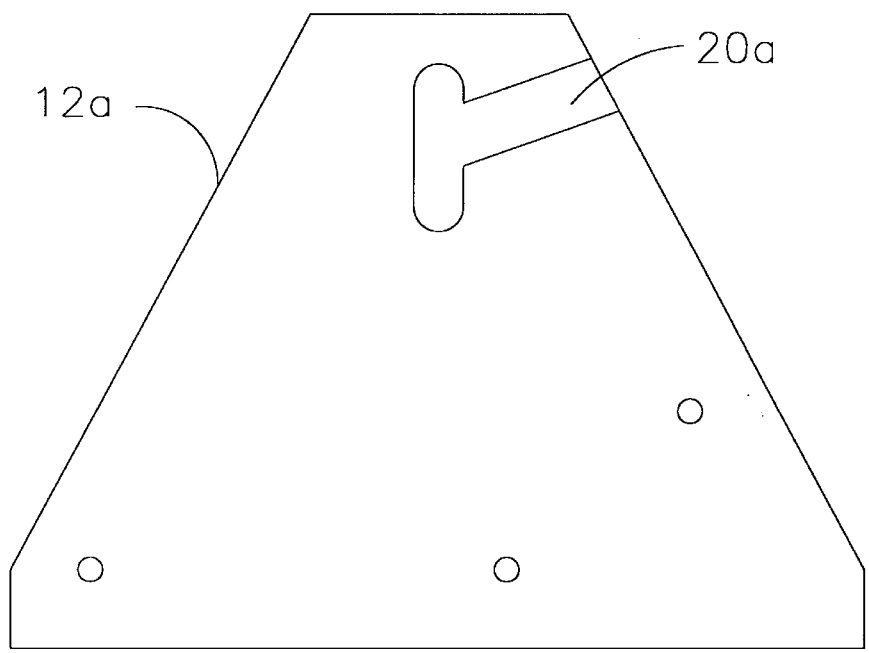
FIGS. 2A to 2C are elevational views of one of the two similar upright bases featured on the invention shown in FIG. 1.
Figure 2C:
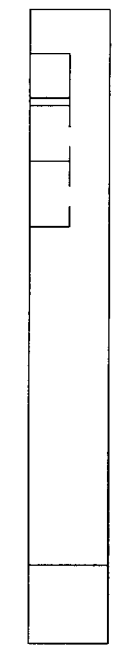
Figure 2B:
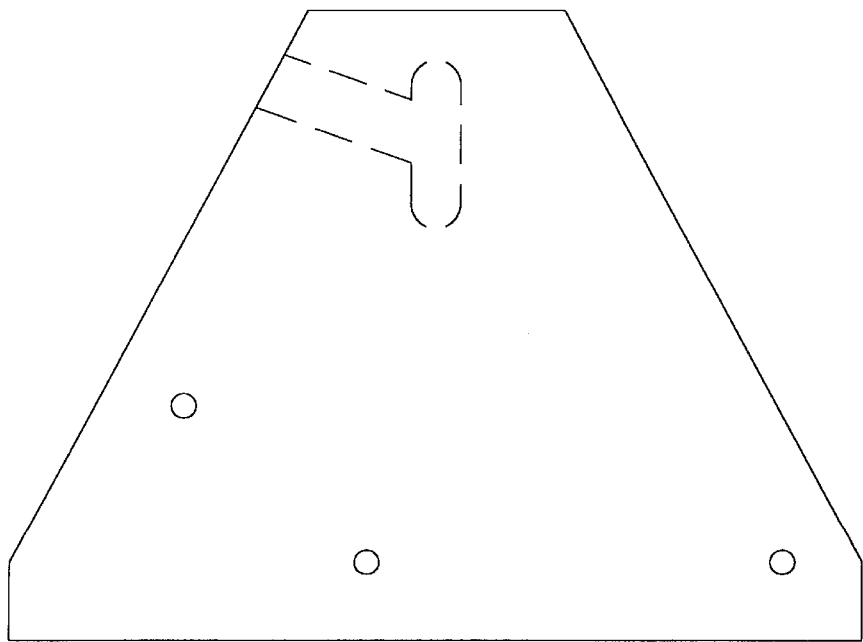

FIGS. 2A, 2B and 2C show elevational views of the base 12a. The invention contains two bases 12a,12b. The embodiment shown in FIGS. 2A, 2B and 2C is constructed of 1" thick wood chosen for strength and cosmetic features. Any sturdy material such as plastic, metal or laminated fibrous material could be substituted for the wood. The shape and thickness used in this embodiment provide a balanced appearance and a sturdy support for the device or invention. The widest portion, located at the bottom of the bases 12a,12b is sufficient to prevent tipping during operation of the device. The dimensions of the bases are similar, being 8" high, 10 ¾" wide at the bottom and 3 ⅛" wide at the top with a 1" thickness overall. The shape is similar to an isosceles triangle with its angles having been sheared off. Base 12a is a left base and 12b is a right base as a groove 20a,20b is featured on the inside face of each base respectively (FIGS. 3A, 3B).

FIGS. 2A and 2B show the groove 20a on base 12a. The groove is similar to both bases 12a,12b. This groove is "T"-shaped and routed ½" deep overall. The opening channel of the groove 20a,20b is located 1 ⅛" from the top edge of the base on the sloped rear edge (FIG. 2C). This opening channel is ¹¹⁄₁₆" wide extending approximately 2" in a downward slope (approximately 24 degrees) until it intersects a vertical channel. This vertical channel is ⅝" wide and 2 ³⁄₁₆" long and rounded at both ends. This channel is located centrally on the base 12a,12b with its upper end located ¾" below the top edge of the base. The opening channel and the vertical channel intersect at the midpoint of the vertical channel forming a "T" shape.

Three ⁵⁄₁₆" diameter holes 24 are located on each base 12a,12b and are similar to both bases (FIGS. 2A, 2B). The centerpoints of the front and center holes 24 are located 1" from the bottom of the base and 1" and 6" respectively from the front edge of the base. The rear hole's 24 centerpoint is located at 6 ¼" perpendicularly from the bottom edge of the base and 1 ³⁄₁₆" horizontally from the rear edge of the base.

The rods or struts 14a,14b,14c are similar (FIGS. 3A, 3B). In this embodiment they are ¼" diameter stainless steel, 24" in length with 1 ½ of ¼×20 SAE threads on each end. Stainless steel was chosen for its corrosion resistance and its strength to resist bowing. Rods 14a and 14b serve as struts in addition to providing the mounting base and guide for the tension arm assembly 16 (FIG. 3B).

FIG. 4 shows an exploded detail of the tension arm assembly 16. The tension arm assembly 16 features two arms 30a,30b each with rounded ends, each 6" in length and constructed of ¾" wide by ⅛" thick flat aluminum. Aluminum was chosen for its light weight and resistance to corrosion. Each arm 30a,30b features a similar series of ⅛" diameter adjustment holes 40 centrally located lengthwise along the inside edge of the respective arms 30a,30b. The holes 40 are ¾" apart. Arm 30a, the upper arm, has a ²¹⁄₆₄" diameter mounting hole 46a at its lower end and a ¼" diameter mounting hole 48 at its upper end. Arm 30b, the lower arm, has one ²¹⁄₆₄" diameter mounting hole 46b,46c located at each end. The centers of the above mentioned 4 mounting holes are located at ⅜" from the rounded ends of the respective arms 30a,30b.

A plastic wheel 36 similar to a pulley guide wheel or door roller guide is attached to arm 30a at the upper end through hole 48 with a ¼"×20×¾" bolt 38 and secured with a ¼"×20 locknut 42. The plastic wheel 36 is 1 ¼" in diameter and ⁵⁄₁₆" wide with a grooved edge. The wheel 36 features a ⅜" steel bearing with a ¼" center hole.

The tension arm assembly 16 also features two similar set collars 34 and two similar step or shoulder bushings 32 (FIG. 4). The set collars 34 are aluminum, ⁵⁄₁₆" wide with a ⁵⁄₁₆" I.D. and a ⅝" O.D. The step bushings are aluminum, ⅞" in length with a ⁹⁄₃₂" I.D. overall. The O.D. "steps" from a ⁵⁄₁₆ O.D.×⁹⁄₁₆" to a ⅝" O.D.×⁵⁄₁₆". A step bushing 32 is inserted through hole 46c in arm 30b and secured with a set collar 34. A step bushing is also inserted through hole 46b on arm 30b and hole 46a on arm 30a and secured with a set collar 34. This step attaches arm 30a adjacent to arm 30b loosely, creating a pivot point.

The mounting of the tension arm assembly 16 to the device is accomplished by first sliding rod 14a which will be the front rod on the invention through the latter bushing assembly described in the previous paragraph. Then rod 14b, the center rod on the invention or device, is slid through the former bushing assembly mentioned in the previous paragraph (FIG. 3B). This method allows the tension arm assembly 16 to slide freely on the rods and traverse the length of the device. Arm 30b the lower arm, is mounted at both ends and is in a stationary position, while arm 30a the upper arm, is mounted to the device by its lower end only, allowing it to pivot in an upward and downward motion.

A ¼"×1 ⅝" extension spring 44 constructed of 0.035 gauge wire is attached at each end to arm 30a and arm 30b respectively by securing the spring 44 ends in the corresponding adjustment holes 40 located on each arm (FIG. 4).

A similar T-nut 22, ¼"×20 with a ⁵⁄₁₆" barrel is attached to both threaded ends of rods 14a,14b and 14c (FIGS. 3A, 3B). The rods are then inserted into the holes 24 located on each base 12a,12b (FIGS. 3A, 3B). Rods 14a and 14b are inserted into the front and center holes 24 respectively. Rod 14c is inserted into the rear holes 24. The rods are inserted until the T-nuts 22 are flush against the bases 12a,12b with the T-nuts' 22 barrels inside the holes 24. The rods 14a,14b, 14c are secured on the outside with similar ¼" flat washers 26 and similar ¼"×20 wingnuts 28 (FIGS. 3A, 3B).

FIGS. 3A and 3B show a supply rod 18. The supply rod 18 is a 22" length of 0.049 thick aluminum tubing with a ⅝" O.D.. The diameter of this rod 18 corresponds to the center hole diameter of the available manufactured fishing line spools. The rod 18 is affixed to the device in this embodiment by inserting each end of the rod 18 into the grooves 20a and 20b respectively. The rod is then pushed downward along the insertion channel of the groove until it reaches the vertical channel of the groove (FIG. 2A). The rod 18 is then pushed downward into the vertical channel until it reaches the bottom of this channel. This is the functional position of the supply rod 18. A smaller diameter rod of equal length can be inserted and stored inside the supply rod 18 since it is made from tubing, to accommodate the smaller spools of fishing line that feature a smaller diameter center hole in their spools.

The above described invention or device provides a sturdy structure for holding and storing multiple spools of fishing line. The device provides the necessary tension to the line spools in an easy to use manner. The composition of the components used in this embodiment of the invention will afford it a long life, benefiting the user.

OPERATION—FIGS. 3A, 3B, 4

The manner of using the tension device and storage rack for fishing line spools is relatively simple. Purchased fishing line supply spools are placed on the supply rod 18 by inserting the rod through the center hole featured on these spools and then sliding the spools onto the rod 18. Each end of the rod, with the spools attached, is then inserted into a groove 20a,20b located on each base 12a,12b respectively (FIGS. 3A, 3B). The rod is then slid downward along the insertion channels of the grooves until it reaches the vertical channels of the grooves. The rod is then pushed downward to the bottom of the vertical channels. This is the position for holding the line spools for storage and for the process of re-spooling fishing reels. During the re-spooling procedure the rod remains stationary allowing the spools to turn. As a means for carrying the device, rod 18 is lifted straight up until it contacts the upper end of the vertical channel. This is the carrying position of the rod 18.

The tension arm assembly 16 is mounted on the front of the device or invention with its pivot point located on the outside rod 14a (FIG. 3B). The pivoting arm 30a featuring the plastic wheel 36 extends inward toward the center of the device. The assembly's 16 mounting method holds it in an upright position and enables it to be manually slid in either direction across the entire length of the device or invention.

FIG. 4 shows the tension arm assembly featuring an extension or expansion spring 44 that is attached to arm 30a and to arm 30b by means of the adjustment holes 40 located on each arm. The spring 44 in its compressed state holds arm 30a in an upright position. When this arm is pulled upwards or toward the user, the extension spring 44 expands and creates pressure or tension on the arm, thus limiting its movement. With the spring mounted in different sets of the corresponding adjustment holes 40 different levels or amounts of tension are available to the user. The rear holes providing the greatest amount, the foreward holes, the least amount.

The grooved plastic wheel 36 attached to arm 30a provides the contact between the tension arm assembly 16 and the line spools which will be held on the supply rod 18. For the re-spooling or line-winding process, the tension arm assembly 16 is slid across the device's length on its rods 14a,14b and is positioned next to a spool of line. The upper arm 30a is pulled upward, toward the user allowing the plastic wheel 36 to clear the spool's edge. The wheel's 36 grooved edge is then aligned vertically with the spool's edge by sliding the tension arm assembly 16. The arm 30a is then released allowing the wheel's 36 grooved edge to rest against the line spool's edge. The spring 44 applies pressure to the arm creating tension, so the wheel 36 is held in tensity against the spool edge. When the line is pulled from the spool during the re-spooling process, the friction between the wheel edge and the spool edge causes tension to be applied to the spool, slowing its turning ability. Thus, line is pulled from the spool under tension, so it can be reeled onto a fishing reel tightly, as is desired, eliminating any back-lashing effect.

With the tension assembly 16 in position for re-spooling a reel, the line from a supply line spool (assumed to be mounted on the device) is attached to a fishing reel with a knot (standard procedure) and is then reeled directly onto the reel using the reel's handle. The reel remains attached to its rod. The line can be threaded through the rod's eyes during the re-spooling if so desired. Nothing on the device comes into contact with the line to cause wear and tear on the line. Having to apply pressure to the line with fingers while re-spooling a reel is eliminated. The pressure is applied by the tension assembly 16. The line spools are held in the correct position by the device for re-spooling a reel: sideways, aligned with the reel, line coming off of the top of the line spool.

CONCLUSION, RAMIFICATIONS, AND SCOPE

Accordingly, the reader will see that this tension device and storage rack for fishing line spools is convenient, by having the means to load fishing reels from line spools with the proper tension applied affixed to the same apparatus that is used to store the line spools. Fishermen use various types and sizes of line to accommodate different reels and or different fishing situations.

The tension device of the above embodiment is simple to use and operates in a manner unique over any of the previously discussed prior art. It's design being efficient and being in such a manner to allow it to access any of the line spools stored on the apparatus without repositioning them, and to apply tension to any of the individual spools at the point of the spool's rim. Furthermore, there does not seem to be an apparatus on the market that singularly provides the features and advantages of the above described invention.

The description contains many specifications that should not be construed as limiting the scope of the invention, but merely providing illustration of the presently preferred embodiment of this invention.

For example, the invention could be made from various rigid materials, and of another shape. It could employ a tension device of a different design or different mode of operation, or be mounted on the invention in a different manner. The invention could be enclosed in a box or case, or have a different dimension overall. Thus, the scope should be determined by the appended claims and their legal equivalents, rather than by the example given.

I claim:

1. An apparatus for holding fishing line spools for storage and for applying tension to said line spools for reel loading applications comprising:

(a) a rack like structure having upright bases of rigid material, and (b) a plurality of elongated members of equal length for connecting said bases wherein each of said members is joined perpendicularly at each end to each base respectively, and (c) a removable, elongated rod mounted on said structure for accommodating multiple spools of fishing line simultaneously, and (d) a sliding tension device affixed to said structure so as to be able to apply tension to any of said line spools during reel loading, and without having to reposition any of the line spools and in such a manner as to avoid any contact with said fishing line, thereby allowing the user to store multiple spools of line on the same facility as is used to apply tension to the line spools for reel loading.

2. The apparatus of claim 1 wherein said tension device is attached in such a way as will allow it to traverse horizontally, back and forth, the entire length of said structure.

3. The apparatus of claim 1 wherein said tension device comprises: a stationary arm and a pivoting arm, and said arms being connected by a compression spring, with said pivoting arm having a wheel attached.

4. The apparatus of claim 3 wherein said wheel contained on said tension device is depressed against said line spool's rim to create tension on the spool, and thus to the line contained thereon.

* * * * *